Figure 2:
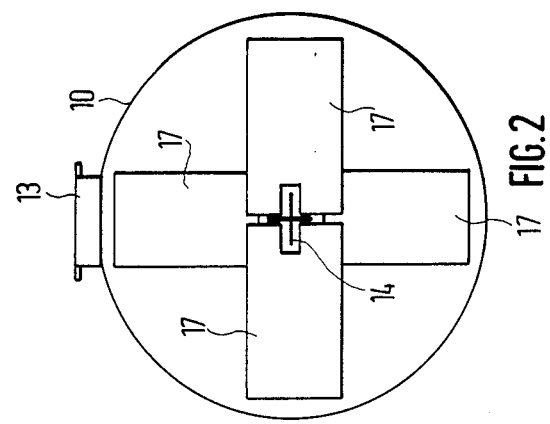

United States Patent [19]

Gerhard

[11] Patent Number: 4,796,773
[45] Date of Patent: Jan. 10, 1989

[54] TRANSPORT TANK INCLUDING SLOSH GUARD ELEMENTS

[75] Inventor: Helmut Gerhard, Weitefeld, Fed. Rep. of Germany

[73] Assignee: Westerwaelder Eisenwerk Gerhard GmbH, Weitefeld, Fed. Rep. of Germany

[21] Appl. No.: 44,029
[22] PCT Filed: Aug. 25, 1986
[86] PCT No.: PCT/DE86/00341
§ 371 Date: Jun. 23, 1987
§ 102(e) Date: Jun. 23, 1987
[87] PCT Pub. No.: WO87/01101
PCT Pub. Date: Feb. 26, 1987

[51] Int. Cl.[4] ............................................. B65D 1/24
[52] U.S. Cl. ................................... 220/22; 220/85 S
[58] Field of Search ................... 220/85 S, 22, 21, 1 B

[56] References Cited

U.S. PATENT DOCUMENTS

| | | | |
|---|---|---|---|
| 1,678,823 | 7/1928 | Pyzel | 220/85 S |
| 2,379,126 | 6/1945 | Welden | 220/22 |
| 2,840,259 | 6/1958 | Steidl | 220/22 |
| 2,860,809 | 11/1958 | Perry . | |
| 3,220,508 | 11/1965 | Nordquest et al. | 220/22 |
| 3,349,953 | 10/1967 | Conaway et al. . | |
| 3,374,916 | 10/1986 | Herff . | |
| 3,795,204 | 3/1974 | Waguespack . | |
| 3,979,005 | 9/1976 | Robinson et al. | 220/22 |
| 4,077,884 | 3/1978 | Naumann | 220/22 |
| 4,517,231 | 5/1985 | May et al. | 220/22 |

FOREIGN PATENT DOCUMENTS

| | | |
|---|---|---|
| 468814 | 11/1928 | Fed. Rep. of Germany . |
| 7105350 | 2/1971 | Fed. Rep. of Germany . |
| 2133023 | 1/1973 | Fed. Rep. of Germany . |
| 6500968 | 1/1965 | Netherlands . |

OTHER PUBLICATIONS

"Maschinenmarkt-Europa Industrie Revue", 3-70, pp. 20-22, by Gerhard Krause.

Primary Examiner—Joseph Man-Fu Moy
Attorney, Agent, or Firm—Barnes & Thornburg

[57] ABSTRACT

When a transport tank for transporting liquids is to be transported with only a partial load, the slosh forces occurring in this case may be reduced by means of slosh guard elements adapted to be built into the already existing tank. The slosh guard elements comprise strips of material bent generally to Ω-shape, which are fixed in the region of the opening of the Ω-shape to rails having cross profile. The rails and the slosh guard elements are dimensioned such that they can be introduced through the manhole provided in the tank outer wall.

26 Claims, 4 Drawing Sheets

U.S. Patent  Jan. 10, 1989  Sheet 3 of 4  4,796,773

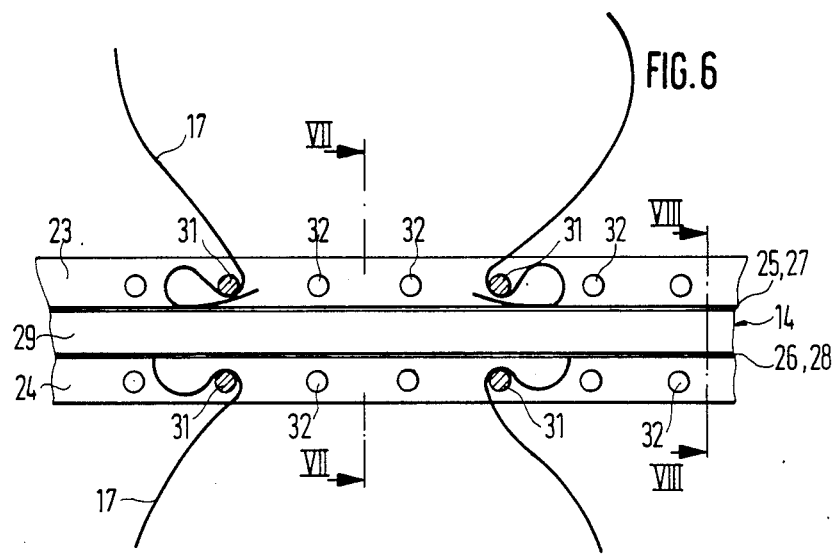
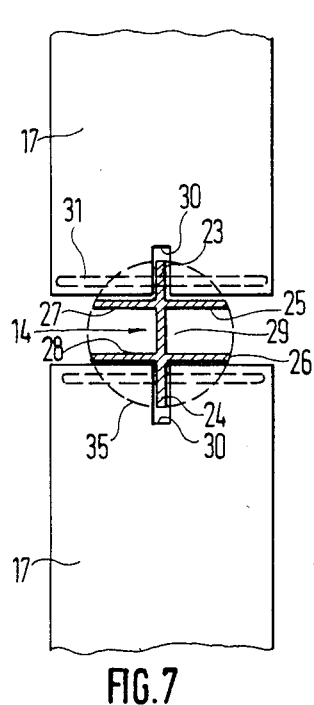
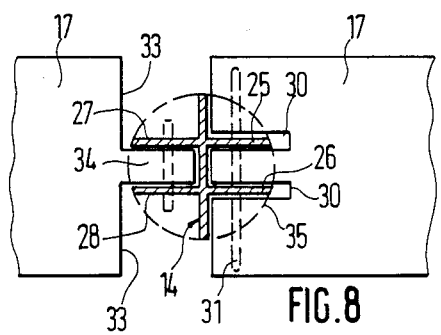
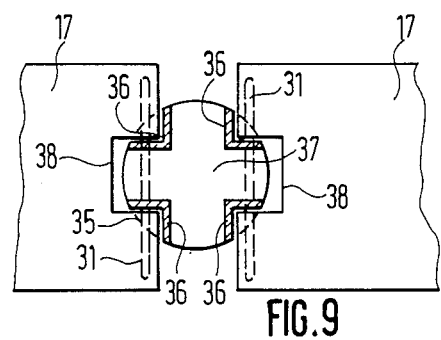

TRANSPORT TANK INCLUDING SLOSH GUARD ELEMENTS

The invention concerns a transport tank for transporting liquids which comprises a manhole and slosh guard elements in its interior. Such a tank may be either a self-contained transport tank container or part of a tank truck.

There is a general tendency towards constructing transport tanks of maximum size, and for 20-foot containers the upper limit currently is at a capacity of c.27 $m^3$ for an ISO-standardized length of about 6 m. On the other hand, the permissible total weight of such transport tanks is somewhat in excess of 300 kN. When a large tank is loaded with heavy liquids, this weight limit is reached already when the tank is partially filled. Since there occur considerable eccentricities of the centre of gravity during the transport of partially filled tanks due to decelerations and while negotiating bends, international rules require that a transport tank for transporting liquids, when filled to less than 80%, must be provided with slosh guard plates, wherein 70% of the cross-sectional area of the tank should be slosh-protected, though this value of 70% has not been sufficiently substantiated either empirically or by calculation.

In the journal "Maschinenmarkt - europa industrie revue" 3–70, pp. 20–22, Gerhard Krause deals with road tank trucks for transporting dangerous goods and presents a tank in said essay which is provided in its interior with slosh guard plates extending transversely and longitudinally. These slosh guard plates are fixedly welded into the tank while the tank is being manufactured. Since columns of liquid act dynamically on either side in longitudinal and transverse directions, the plates themselves and their mounting to the inner wall circumference must be stable and fatigue-proof. Due to the fact that the slosh forces occur by jerks and jolts, long twin fillet welds are required which cover the tank circumference either completely or to a major extent. On the other hand, openings are necessary in the top and bottom regions of the slosh guard plates for deaerating and completely emptying the tank. Expensive reinforcing plates must be provided at the terminal points of said openings in order to reduce peak stresses occurring thereat. Furthermore, it is not every tank compartment formed by slosh guard plates that is provided with a manhole, and a larger entry port is respectively required to allow the carrying-out of inspection and cleaning work. Therefore, structures of this type having fixedly welded slosh guard plates are expensive to manufacture, hinder cleaning work, increase the tare weight of the transport tank, and exhibit considerable risks of fatigue and resulting leakage. Apart from these facts, fixedly built-in slosh guard plates only make sense when it can be predicted that the tank will again and again be transported with a partial load.

The invention is based on the object of providing a transport tank for transporting liquids, comprising slosh guard elements which are highly efficient for damping slosh forces occurring in longitudinal, transverse and vertical directions, do not require fixed parts in the tank interior, permit easy cleaning of the tank and allow the provision of similar tanks, especially those of very large capacity, which permit the transport of light liquids without any unnecessary tare weight, on the one hand, and also permit the transport of heavy liquids without the risk of unacceptable eccentricites of centre of gravity, on the other hand.

The solution of this object in accordance with the invention comprises dimensioning the slosh guard elements such that they can be introduced through the manhole and be detachably secured in the tank. Accordingly, the transport tank comprises a concept in which the slosh guard elements can be assembled, if required, in the finished tank and can also be removed therefrom. The slosh guard elements and retaining means are dimensioned so that they may be introduced into the tank interior through the manhole either with or without elastic deformation and may be assembled therein. Neither fixed parts nor welding operations are required in the tank interior. Therefore no peak stresses are transmitted to the tank outer wall.

Especially preferred embodiments include advantageous improvements concerning the anchoring of the retaining means in the tank interior, in which one improvement involves a structural member insertable in the manhole for supporing bar structure supports for the slosh guard elements, which permits an especially safe suspension at a point fixed to the tank without any damage to the possibly coated or polished tank inner wall. This feature, either alternatively or additionally, with bar structure composed of two parts connected by a toggle joint allows bracing relative to three locations of the tank. In either case a controlled wedge effect is utilized for fixing purposes, which effect results from the fact that the radius of curvature of the tank bottom or, respectively, of the flange portion is smaller than half the length of the bar structure extending axially through the tank or, respectively, of the respective bar element.

Certain preferred embodiments of the invention use bare structures in the form of rails having cross profiles including two webs extending in mutually perpendicular directions which are advantageous because they offer a simple reliable possibility of fixing the slosh guard elements to the retaining means. When a cross profile including two transverse webs is used, said webs should in the assembled state be arranged vertically above each other so as to impart maximum rigidity against flexure to the bar structure itself and also to allow laterally projecting slosh guard elements to be secured with maximum stability.

A further improvement of certain preferred embodiments of the invention provides bar structure in the form of a plurality of bars that can be serially introduced through the manhole to be interconnected in the tank interior in parallel alignment, an arrangement which offers the possibility of composing the bar structure within the tank of two or more sufficiently rigid and buckle-proof bars which may be interconnected either in ladder-like or lattice pole-like manner, so that an overall cross-section of the bar structure is achieved which is larger than the diameter of the manhole. Such a bar structure has high inherent rigidity, and at the same time the risk of yielding from the intended assembled position between the two tank bottoms is further reduced. When three bars are used, such arrangement offers the advantageous possibility of reducing slosh effects especially in the particularly susceptible upper portion of the tank interior.

Embodiments of the slosh guard elements which are especially favourable from the viewpoint of manufacture, of introduction thereof into the tank and of assembly inside the tank includes slosh guard elements of flexible strip material with parts adapted to be secured to the retaining means in generally shaped condition, with appropriate slots or cut-outs for fitting in webs of the bar structure profile, and with the strip material ends adapted to be resiliently braced to the retaining means. The width of the accordingly provided strip material may exceed the maximum inner diameter of the manhole and the material may be bent elastically in longitudinal direction when being introduced into the tank, so that a maximum slosh-inhibiting "sail" area is provided in the tank interior. The Ω-shaped design is favourable not only from the viewpoint of assembly but offers the additional advantage that two slosh guard areas spaced one behind the other are obtained, which produce correspondingly effective turbulences and thus twice the amount of slosh consumption and are capable of elastic absorption thereof in themselves.

In certain preferred further embodiments of the invention the strip material length is dimensioned so that said parts do not contact the tank inner wall in the assembled condition so that the liquid flows about the slosh guard elements in the tank interior, whereby the formation of turbulences and thus slosh consumption is promoted, on the one hand, and damage to the tank inner wall by the slosh guard elements is prevented, on the other hand. In certain preferred embodiments the slosh guard elements are adapted to be mounted in several cross-sectional planes of the tank and, as viewed in the tank longitudinal direction, in offset relationship, which arrangement represents a further means for highly efficient reduction of slosh forces in the entire tank interior.

In respect of the prior art the following publications are furthermore pointed out:

U.S. Pat. No. 2,860,809: Here, slosh plates extending transversely to the longitudinal axis of the tank are joined to the tank wall via elastic suspension means in order to prevent the transmission of peak stresses to the tank wall. On the whole, however, the slosh plates are fixedly mounted.

U.S. Pat. No. 3,374,916: Here, too, slosh surface elements are fixedly mounted but have relatively small area, while they are arranged in offset relationship along the longitudinal direction of the tank so as to produce turbulences.

NL-A 6,500,968: Slosh vanes, which by the way are not effective in longitudinal direction which is the most important direction in transport tanks, are not fixedly joined to the tank wall but are introduced through an end opening. Normally, however, this is not possible with a finished tank.

U.S. Pat. No. 3,349,953: In this case perforated hollow members serve as slosh guard elements which substantially fill the container interior. This solution is not suitable for transport tanks, because such hollow members make emptying difficult and in practical use can be removed only at extraordinary expense of labour, so that the tank can practically not be cleaned.

Figure 1:
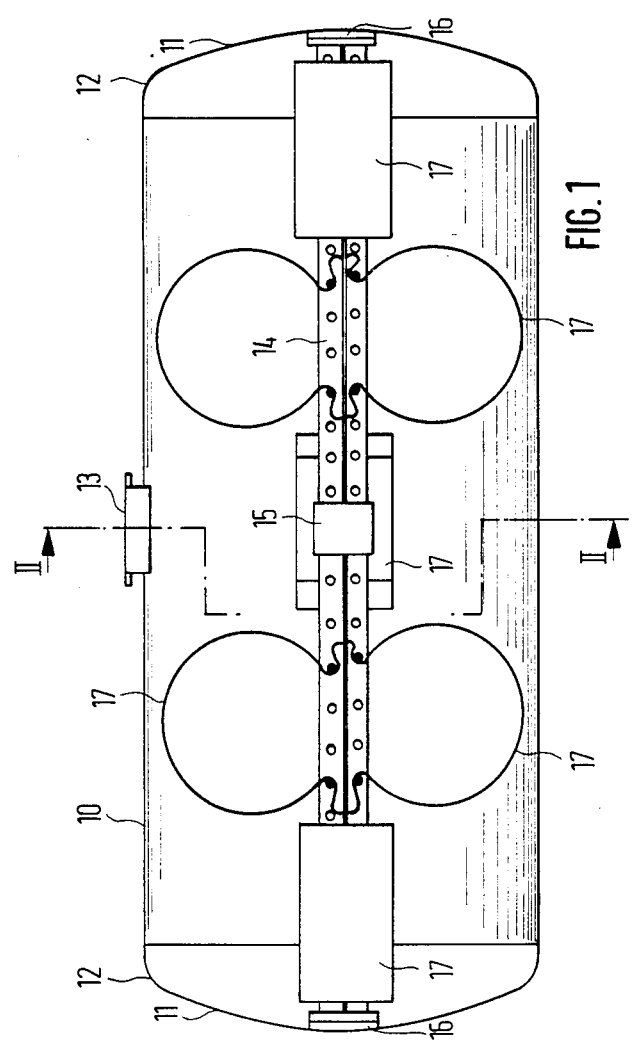
Figure 10:
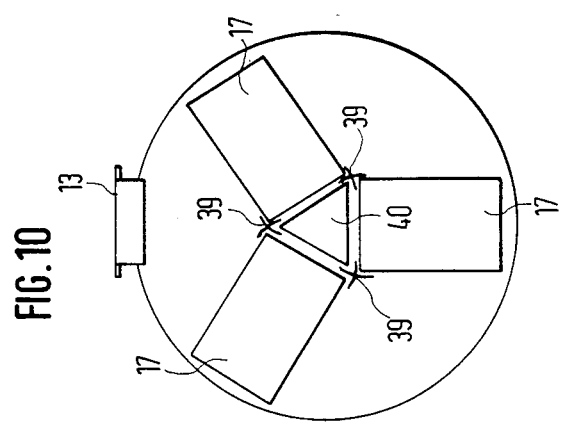
Figure 5:
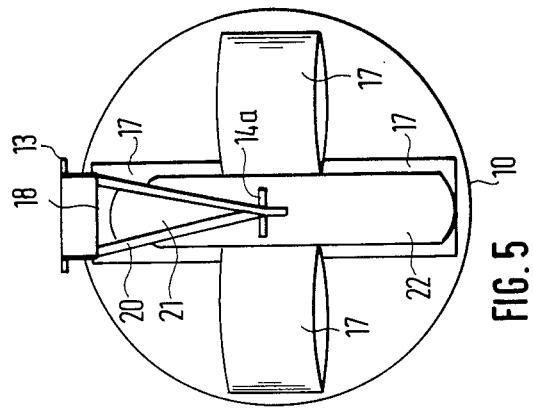

Preferred embodiments of the invention will be described in detail below with reference to the drawings, in which FIG. 1 is a schematic longitudinal sectional view through a transport tank including built-in slosh guard elements, FIG. 2 is a cross-section through the tank of FIG. 1 along the line II—II, FIGS. 3 and 4 respectively are schematic longitudinal sectional views through further embodiments of a transport tank including built-in slosh guard elements, FIG. 5 is a cross-section through the tank of FIG. 4 along the line V—V, FIG. 6 is a detail of FIG. 1 illustrating the shape and mounting of slosh guard elements on a retaining means, FIGS. 7 and 8 are cross-sections through the arrangement of FIG. 6 along the lines VII—VII and VIII—VIII of FIG. 6, FIG. 9 is similar to FIG. 8 illustrating a different cross-sectional shape of the bars of the retaining means, and FIG. 10 is a cross-section through a further embodiment of a transport tank.

The transport tank shown in FIGS. 1 and 2 comprises a circular cylindrical tank outer wall 10 closed at either end by an approximately basket arch-like tank bottom 11 welded thereto. The main portions of the tank bottoms 11 are spherically curved and join the cross-sectional shape of the tank outer wall 10 via a more strongly curved flange portion 12. At the topmost location the tank outer wall is provided approximately at the centre of its longitudinal extension with a manhole 13 closed by a cover, through which a workman may enter the tank interior for inspection purposes and for performing assembly work.

A rail 14 extends along the central axis of the transport tank and has a simple cross profile as illustrated in FIG. 2. The rail 14 is composed of two parts adapted to be joined via a central coupling 15 to form a rigid unit. Depending on the ratio of tank diameter to tank length it may also be necessary to compose the rail of three parts via two couplings so that the individual parts are sufficiently short to be introduced through the manhole 13 into the tank interior. Each of the two outermost ends of the rail 14 is provided with an annulus or foot which—as indicated in FIG. 1—is supported by means of an elastic O-ring or a lip 16 in the central region of the respective tank bottom 11 and like the Ω-elements may be open at one point so that it can also be larger than the manhole diameter.

In the embodiment illustrated in FIG. 1 a total of ten slosh guard elements 17 is mounted on the rail 14, each of said elements consisting of a strip of material generally bent to Ω-shape. As shown in FIG. 1, six of these slosh guard elements 17 extend in horizontal and four in vertical direction, wherein three extend in the drawing plane to the rear, three extend to the front (the middle one is not illustrated), two extend upwards and two extend downwards. The strip of material may have a width slightly less than the diameter of the manhole 13. Each slosh guard element 17 may be made of relatively rigid material and may be rotated in preformed condition through the manhole 13 into the tank interior. Alternatively, it is also possible to employ a flexible strip of material whose width may be in excess of the manhole diameter; in that case the strip of material is introduced through the manhole 13 while being elastically bent about its longitudinal axis and is then bent to the shown Ω-shape in the tank interior while being mounted on the rail 14. In this way a correspondingly increased slosh-inhibiting area is obtained. The individual strips of material are dimensioned such that the assembled slosh guard elements do not contact the tank inner wall so as to avoid any damage to the possible coated or polished tank wall. On the other hand, the slosh guard elements extend outwardly as far as possible so as to offer maximum area to the occurring liquid flows. As illustrated in FIG. 1, the slosh guard elements 17 are arranged in respective pairs across the width and height of the tank while in longitudinal direction of the tank they are respectively arranged alternatingly in horizontal and vertical extension so as to produce a strong slosh-inhibiting effect by maximum turbulences.

Fastening of the individual Ω-shaped slosh guard elements 17 to the cross-profile rail 14 will be explained below in connection with the FIGS. 6 to 9.

Figure 3:
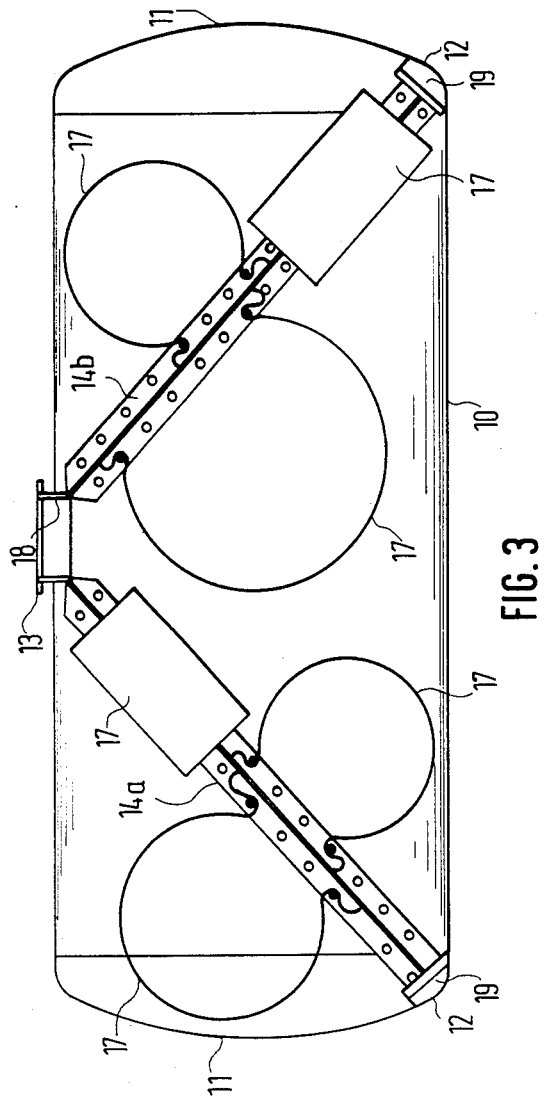

The embodiment of FIG. 3 differs from that of FIG. 1 in that two separate rails 14a, 14b are used to retain the slosh guard elements 17, each of said rails being inserted in the tank in an oblique position and the rails being supported with their lower ends in the respective flange portion 12 of the tank and being secured with their upper ends to a structural member such as a pipe socket 18, a frame or ring which is inserted in, around or beneath the manhole 13 and anchored therein. To avoid damage to the tank inner wall here, too, the lower ends of the rails 14a, 14b are provided with elastic feet 19 which are matched to the inner profile of the flange portion 12. In further contrast with the embodiment of FIG. 1 the Ω-shaped slosh guard elements 17, which are secured in vertical extension to the rails 14a, 14b, are not arranged in stacked pairs but in different sizes and offset relationship along the respective rail 14a, 14b such that the tank interior is most effectively divided by slosh guard elements. As illustrated, the various slosh guard elements 17 may have different sizes. They should establish a maximum slosh-inhibiting area in the respective available space. Although any contact relative to the tank inner wall is undesirable, mutual supporting of adjacent slosh guard elements 17 may be appropriate for reinforcing purposes.

Figure 4:
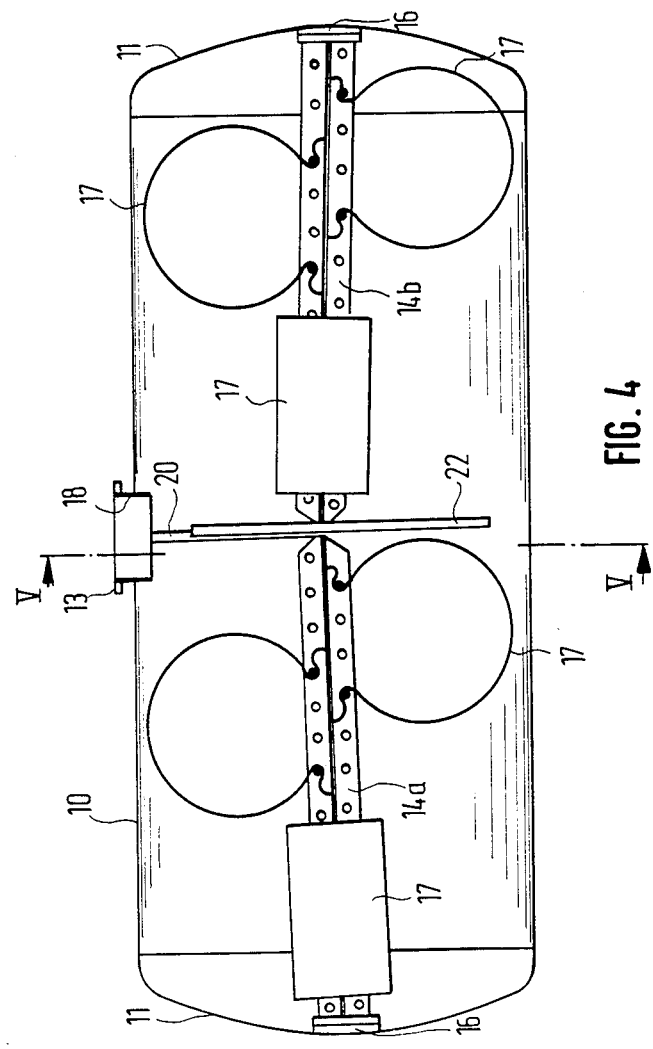

The embodiment of FIGS. 4 and 5 differs from that of FIG. 3 in that the inner ends of the two rails 14a, 14b are secured to the lower ends of generally V-shaped bars 20 and are supported with their outer ends, similar to the embodiment of FIG. 1, in the central region of the respective tank bottom 11. The bars 20 in their turn are mounted with their upper ends on two diagonally opposite locations of a pipe socket 18 fitted into the manhole 13. The bars 20 may be welded to the pipe socket 18 and fitted into the manhole 13 in combination therewith. Furthermore, the V-shaped interior region of the bars 20 may be provided with a generally triangular plate 21 and the outside and bottom side may be provided with a plate 22, both plates 21 and 22 in the assembled condition being located in a cross-sectional plane of the tank and additionally forming slosh guard elements curved on one or two sides.

FIGS. 6 to 8 illustrate the mounting of the generally Ω-bent metallic or plastics slosh guard elements 17 on the rails 14 and 14a, 14b, respectively, wherein it is assumed in contrast with FIG. 2 that the profile of said rails is a double cross ("cross of Lorraine") comprising an upwardly extending web 23, a downwardly extending web 24, two rightwardly extending webs 25, 26 in parallel relationship one above the other, two leftwardly extending webs 27, 28 in parallel relationship one above the other, and a central web 29. As illustrated in FIG. 7, the vertically extending slosh guard elements 17 are each provided in their inward portion with a central slot 30 which is engaged by the upper web 23 or the lower web 24, respectively, of the rail 14. As will be apparent from the top of FIG. 6, the inward portions of these generally Ω-bent slosh guard elements 17 are initially bent outwards and then again inwards. Inside of their inward bend they are fixed by bolts 31 each of which passes through one of a plurality of holes 32 formed in the upper web 23, and are supported with their lowermost ends on the topmost horizontal webs 25 and 27 of the rail 14. In this way resilient fixing of the slosh guard elements 17 is achieved. As illustrated in FIG. 7, the length of the bolts 31 corresponds approximately to the width of the slosh guard elements 17.

The lower portion of FIG. 6 illustrates a somewhat different embodiment, in which the ends of the approximately Ω-bent slosh guard elements 17 are no longer bent back inwardly but meet the lower webs 26, 28 of the rail 14 approximately vertically, so that also in this case elastic mounting is achieved by means of fixing with bolts 31.

The right-hand portion of FIG. 8 shows that the horizontally extending slosh guard elements 17 are provided in those regions where they are mounted on the rail 14 with two parallel slots 30 which are engaged by the two lateral webs 25, 26 of the rail 14. For the rest, the lateral slosh guard elements 17 are designed and secured in a way similar to that illustrated in the upper or the lower portion of FIG. 6. As will be apparent from the left-hand portion of FIG. 8, it is also possible to provide in place of the slots 30 lateral cut-outs 33 whereby there remains a central portion 34 that fits between the two lateral webs 27, 28 of the rail 14.

When using a double-cross profile according to FIGS. 7 or 8 it is appropriate to mount the rails 14 in the tank in such a way that the two webs 23 and 24 extend vertically while the four remaining webs 25 to 28 extend horizontally, so that the bolts 31 for fixing the laterally projecting slosh guard elements 17 engage in corresponding holes in two opposed webs to thereby result in improved anchoring of the lateral slosh guard elements relative to gravity.

FIGS. 7 and 8 show that the ends of all of the webs 23 to 28 are located on a circle (indicated in dashed lines) the diameter of which is smaller than the diameter of the manhole 13 by such an amount that the rails 14 can be inserted into the tank in the required oblique orientation. Since the rail 14 is intended not only to carry the slosh guard elements but also to serve itself as a slosh guard element for reducing slosh forces which act transversely to the tank axis, the profile of the rail should be maximum while allowing introduction of the rail through the manhole 13.

According to FIG. 9 the cross profile of the rail 14 is obtained by four discrete rails 36 each having L-cross-section, said rails being joined to one another by means of a plurality of cross-shaped junction plates 37 that are arranged at a distance from one another in longitudinal direction of the tank and being dimensioned and arranged such that all of the eight outer edges of the discrete rails 36 lie on the above-mentioned circle 35 (also indicated in dashed lines in FIG. 9). For securing both the vertically and the horizontally extending slosh guard elements 17, the embodiment of FIG. 9 respectively includes two mutually spaced webs in which holes for the passage of bolts 31 therethrough are formed. FIG. 9 shows a further modification of the inner ends of the discrete slosh guard elements 17 in which, instead of the two slots 30 provided in the right-hand portion of FIG. 8, an internal recess 38 of U-section is provided the two mutually parallel sides of which engage the outer surfaces of the webs formed by the discrete rails 36.

When it is required that an existing tank is to be provided with slosh guard elements, i.e. when the tank is to be transported partially loaded, the parts of the rail 14 are initially introduced through the manhole 13 into the tank, where they are assembled and secured in the tank interior as illustrated in FIG. 1, FIG. 3 or FIG. 4. When suitable dimensions are chosen, bracing relative to the tank wall may be achieved which in the embodiment of FIG. 3 and particularly in the toggle-like embodiment of FIG. 4 can be achieved by a final vertical displacement of the pipe socket 18 prior to anchoring thereof in the manhole 13. Thereupon the various material strips are introduced through the manhole 13 and fixed to the rails in the manner shown in FIGS. 6 to 9.

As has been explained by means of FIGS. 7 to 9, the profile of the rails 14 and 36 illustrated therein may be circumscribed by a circle 35 which is smaller than the manhole 13 by such an amount that the assembled rail can be introduced through the manhole into the tank interior. On the other hand, in the embodiment shown in FIG. 10 the bars carrying the slosh guard elements 17 are constructed of three discrete bars 39 which are introduced one by one through the manhole 13 and are aligned in parallel to each other in the tank interior and are detachably interconnected by means of triangular junction plates 40. Each of said bars 39 has cross-like cross-section, respective pairs of the individual legs of said bars extending normal to each other and in parallel to the boundary edges of the slosh guard elements 17. In FIG. 10, the three bars 39 constitute an equilateral triangle the length of the edges thereof is slightly larger than the width of the slosh guard elements 17 which may themselves—as explained above—be wider than the diameter of the manhole 13. In this way the total cross-sectional area of the bar structure constituted by the three bars 39 becomes relatively large whereby the rigidity is improved. Moreover, the ends of said bar structure define correspondingly large bearing surfaces so that upon assembly e.g. according to FIG. 1 the risk of displacement of the bar structure from its desired axial position is further reduced.

As illustrated in FIG. 10, the three bars 39 are arranged inside the tank in such a way that one row of slosh guard elements 17 extends vertically downwardly while two further rows of slosh guard elements 17 extend obliquely upwardly on either side. With this type of assembly a correspondingly large slosh-inhibiting total area is available in the upper portion of the tank interior which is particularly exposed to slosh effects in case of partial loads.

Instead of the modification shown in FIG. 10 it is also possible to compose a bar structure of four or more discrete bars which are interconnected by correspondingly designed rectangular, pentagonal or even round junction plates. The junction plates themselves will then also act as slosh guard elements. On the other hand, with regard to an optimum displacement-proof anchoring of the bar structure in the tank interior it may also be appropriate to provide only two bars in parallel to each other and to interconnect them either like a ladder or by means of a closed sheet-metal strip.

I claim:

1. A slosh guard arrangement for transporting liquids and the like of the type including cylindrical wall means closed at both axial ends to form a cylindrical tank, and a manhole extending radially through the cylindrical tank wall means, said man hole having a cross-sectional size substantially smaller than the cylindrical cross-section of the tank, said slosh guard arrangement comprising:

slosh guard elements exhibiting liquid movement dampening surfaces, and slosh guard element retaining means for retaining said slosh guard elements in position inside the tank with liquid movement dampening surfaces of said slosh guard elements extending transversely to the longitudinal axis of the tank, wherein said slosh guard elements and said slosh guard element retaining means are dimensioned and configured to be insertable into the tank and assembled into their operative positions via the manhole without disturbing the remaining structure of the tank.

2. A slosh guard arrangement according to claim 1, wherein said slosh guard element retaining means includes bar structure abuttingly supportable directly at the manhole when in its operative position.

3. A slosh guard arrangement according to claim 1, wherein said slosh guard element retaining means includes bar structure abuttingly supportable directly at the respective opposite axial ends of the tank when in its operating position.

4. A slosh guard arrangement according to claim 2, wherein said slosh guard element retaining means includes bar structure abuttingly supportable directly at the respective opposite axial ends of the tank when in its operating position.

5. A transport tank for transporting liquids, comprising a manhole and being provided in its interior with slosh guard elements, characterized in that the size of said slosh guard elements is dimensioned such that they could be introduced through said manhole, in that said elements are detachably secured to retaining means which are likewise adapted to be introduced through said manhole and to be braced within the tank, in that the slosh guard elements comprise parts of strip material, and in that the parts of strip material are adapted to be secured to said retaining means in generally $\Omega$-shaped condition.

6. A transport tank as claimed in claim 1, characterized in that the ends of the parts of strip material are provided with slots or cut-outs for fitting therein at least one web of the bar structure cross-profile.

7. A transport tank as claimed in claim 5, characterized in that the ends of the parts of strip material are adapted to be resiliently braced to said retaining means.

8. A transport tank as claimed in claim 5, characterized in that the lengths of said parts of strip material are dimensioned so that said parts do not contact the tank inner wall in the assembled condition.

9. A transport tank for transporting liquids and the like comprising:

cylindrical wall means closed at both axial ends to form a cylindrical tank, a manhole extending radially through the cylindrical tank wall means, said man hole having a cross-sectional size substantially smaller than the cylindrical cross-section of the tank, slosh guard elements exhibiting liquid movement dampening surfaces, and slosh guard element retaining means for retaining said slosh guard elements in position inside the tank with liquid movement dampening surfaces of said slosh guard elements extending transversely to the longitudinal axis of the tank, wherein said slosh guard elements and said slosh guard element retaining means are dimensioned and configured to be insertable into the tank and assembled into their operative positions via the manhole without disturbing the remaining structure of the tank.

10. A transport tank according to claim 9, wherein said slosh guard element retaining means includes bar structure abuttingly supportable directly at the manhole when in its operative position.

11. A transport tank according to claim 9, wherein said slosh guard element retaining means includes bar structure abuttingly supportable directly at the respective opposite axial ends of the tank when in its operating position.

12. A transport tank according to claim 10, wherein said slosh guard element retaining means includes bar structure abuttingly supportable directly at the respective opposite axial ends of the tank when in its operating position.

13. A transport tank according to claim 9, wherein the slosh guard element retaining means comprises bar structure to which the slosh guard elements are attached.

14. A transport tank according to claim 13, wherein the bar structure is composed of at least two parts connected to one another by a toggle joint.

15. A transport tank according to claim 13, wherein the bar structure comprises rails having a cross shaped profile formed by rail webs.

16. A transport tank according to claim 15, wherein the cross-shaped profile of the bar structure includes two webs extending in mutually perpendicular directions.

17. A transport tank according to claim 13, wherein the bar structure comprises a plurality of bars which are adapted to be serially introduced through the manhole for subsequent interconnection with one another in the tank interior in parallel alignment with one another.

18. A transport tank according to claim 17, wherein said plurality of bars includes three bars which are detachably connected together by triangular junction plate means, each of said bars having a cross-shaped configuration with individual legs of said bars extending perpendicular to one another and in parallel to boundary edges of respective slosh guard elements, whereby in assembled condition the three bars and the junction plate means define an equilateral trangle at the sides of which radially inward ends of respective slosh guard elements are supported.

19. A transport tank according to claim 18, wherein one of said slosh guard elements extends downwardly and the other two extend obliquely upwardly when in the assembled operative position in the tank.

20. A transport tank according to claim 9, wherein the slosh guard elements comprise parts of flexible strip material.

21. A transport tank according to claim 18, wherein the slosh guard elements conprise parts of flexible strip material.

22. A transport tank according to claim 9, wherein said guard elements have a size larger than the manhole when in an unstressed condition.

23. A transport tank according to claim 20, wherein the parts of strip material are adapted to be secured to the retaining means in generally $\Omega$-shaped condition.

24. A transport tank according to claim 15, wherein the slosh guard elements are formed of parts of strip material, and wherein ends of the parts of strip material are provided with slots fittingly engageable with at least one rail web.

25. A transport tank according to claim 9, wherein the slosh guard elements comprise strip material parts, and wherein the length of said strip material parts in such that they do not contact tank inner walls when in an assembled operative position in the tank.

26. A transport tank according to claim 9, wherein the slosh guard elements are adapted to be supported by the retaining means in a plurality of cross-sectional planes of the tank in respective offset relationship to one another as viewed in the tank longitudinal direction.

* * * * *